United States Patent
Blak et al.

(10) Patent No.: US 8,903,235 B2
(45) Date of Patent: Dec. 2, 2014

(54) CLOSURE ELEMENT COMPRISING A LIGHT SOURCE

(75) Inventors: Claus Blak, Ølstykke (DK); Anders Yde Dahl, Slangerup (DK); Sten Krog Duerlund, Brønshøj (DK)

(73) Assignee: GEA Process Engineering A/S, Soborg (DK)

( * ) Notice: Subject to any disclaimer, the term of this patent is extended or adjusted under 35 U.S.C. 154(b) by 33 days.

(21) Appl. No.: 13/806,471

(22) PCT Filed: Jun. 23, 2010

(86) PCT No.: PCT/DK2010/050160
§ 371 (c)(1),
(2), (4) Date: Feb. 21, 2013

(87) PCT Pub. No.: WO2011/160626
PCT Pub. Date: Dec. 29, 2011

(65) Prior Publication Data
US 2013/0148952 A1    Jun. 13, 2013

(51) Int. Cl.
| | |
|---|---|
| *G03B 17/48* | (2006.01) |
| *G03B 29/00* | (2006.01) |
| *F21V 33/00* | (2006.01) |
| *B01J 3/00* | (2006.01) |
| *F21W 131/411* | (2006.01) |
| *F21Y 101/02* | (2006.01) |

(52) U.S. Cl.
CPC ............... *F21V 33/00* (2013.01); *G03B 29/00* (2013.01); *B01J 3/004* (2013.01); *F21W 2131/411* (2013.01); *F21Y 2101/02* (2013.01)
USPC .......................................................... 396/429

(58) Field of Classification Search
USPC .......................................................... 396/429
See application file for complete search history.

(56) References Cited

U.S. PATENT DOCUMENTS

| | | | | |
|---|---|---|---|---|
| 1,407,975 | A | * | 2/1922 | Wolfe et al. .................. 109/21.5 |
| 1,604,811 | A | * | 10/1926 | Curry et al. .................... 126/200 |
| 1,870,973 | A | * | 8/1932 | Thwaits ........................ 220/244 |
| 2,018,295 | A | * | 10/1935 | Burgls .......................... 114/178 |
| 2,756,324 | A | | 7/1956 | Troik |
| 3,170,383 | A | * | 2/1965 | Hunt ............................. 454/370 |
| 3,340,890 | A | * | 9/1967 | Raskhodoff ............. 137/315.01 |
| 3,511,068 | A | * | 5/1970 | Fujii ............................... 68/177 |
| 3,688,081 | A | * | 8/1972 | Speich .......................... 219/203 |
| 3,746,431 | A | * | 7/1973 | Meginnis ...................... 359/894 |
| 3,764,794 | A | | 10/1973 | King et al. |
| 3,848,961 | A | | 11/1974 | Champeau |

(Continued)

FOREIGN PATENT DOCUMENTS

| | | |
|---|---|---|
| DE | 295 19 499 U1 | 2/1996 |
| WO | 2010010255 A1 | 1/2010 |

OTHER PUBLICATIONS

Communication dated Sep. 15, 2014, issued by the European Patent Office in counterpart European application No. 10730058.4.

*Primary Examiner* — Rodney Fuller
(74) *Attorney, Agent, or Firm* — Sughrue Mion, PLLC (57) ABSTRACT

The closure element (1) is adapted to be installed in a vessel wall provided with an aperture and has a peripheral flange (2) and a central cover unit (3). The closure element (1) is provided with at least one light source within a predefined zone (35) located in the central cover unit (3) and the light source is confined within the central cover unit.

39 Claims, 6 Drawing Sheets

(56) References Cited

U.S. PATENT DOCUMENTS

| | | | |
|---|---|---|---|
| 4,245,566 A * | 1/1981 | Shimansky et al. | 109/49.5 |
| 4,297,757 A * | 11/1981 | Palemon Camu | 114/349 |
| 4,488,141 A * | 12/1984 | Ohlenforst et al. | 362/541 |
| 4,587,599 A * | 5/1986 | St-Hilaire | 362/101 |
| 4,690,070 A * | 9/1987 | Miller | 105/377.11 |
| 5,178,450 A | 1/1993 | Zelensky et al. | |
| 5,230,556 A | 7/1993 | Canty et al. | |
| 5,277,746 A * | 1/1994 | Anderson | 117/55 |
| 5,645,336 A * | 7/1997 | Brown et al. | 362/26 |
| 5,844,668 A * | 12/1998 | Lepain et al. | 356/43 |
| 5,983,819 A * | 11/1999 | Kyle | 114/201 R |
| 6,033,087 A * | 3/2000 | Shozo et al. | 362/244 |
| 6,050,199 A * | 4/2000 | Anderson et al. | 105/377.07 |
| 6,085,664 A * | 7/2000 | Early | 105/377.07 |
| 6,095,365 A * | 8/2000 | Yielding | 220/264 |
| 6,106,136 A * | 8/2000 | Lin | 362/191 |
| 6,290,369 B1 * | 9/2001 | Lin | 362/191 |
| 6,398,382 B1 | 6/2002 | Boyce et al. | |
| 6,450,655 B1 * | 9/2002 | Walck et al. | 362/3 |
| 6,782,184 B2 * | 8/2004 | Canty et al. | 385/138 |
| 7,427,089 B2 * | 9/2008 | Silverio et al. | 292/256.5 |
| 7,835,007 B2 * | 11/2010 | Schauer | 356/446 |
| 8,316,708 B2 * | 11/2012 | Horst | 73/323 |
| 8,407,938 B2 * | 4/2013 | Faria | 49/149 |
| 8,608,021 B2 * | 12/2013 | Poulter | 220/810 |
| 8,649,017 B2 * | 2/2014 | Schauer | 356/445 |
| 2003/0103756 A1 * | 6/2003 | Canty et al. | 385/138 |
| 2004/0076003 A1 * | 4/2004 | Collura et al. | 362/234 |
| 2007/0024063 A1 * | 2/2007 | Silverio et al. | 292/256.5 |
| 2009/0177432 A1 * | 7/2009 | Taylor et al. | 702/134 |
| 2013/0208351 A1 * | 8/2013 | Faria | 359/350 |

* cited by examiner

CLOSURE ELEMENT COMPRISING A LIGHT SOURCE

CROSS REFERENCE TO RELATED APPLICATIONS

This application is a National Stage of International Application No. PCT/DK2010/050160, filed on Jun. 23, 2010, the contents of all of which are incorporated herein by reference in their entirety.

The present invention relates to a closure element adapted to be installed in a vessel wall provided with an aperture, said closure element comprising at least one peripheral flange and a central cover unit, said central cover unit covering said aperture, in which the closure element is provided with at least one light source.

Such closure elements are utilized for a number of applications, for instance in spray drying and fluid bed apparatuses. Here, they may be positioned in the wall of a drying chamber, a process chamber, container, tank, duct or any similar vessel containing one or more of gases, liquids and/or powders and to which it is desired to gain access through the aperture closed by the closure element, either solely by visual means but also when it is desired to accede the interior of the vessel for instance for inspection, maintenance and/or cleaning purposes. Thus, in practice, such closure elements comprise cleaning covers, portholes, inspection or sight glasses.

Operations such as monitoring and surveilling, cleaning, inspecting, of the interior of such a vessel are facilitated to a great extent if the interior of the vessel is sufficiently illuminated, i.e. the provision of light sources must be foreseen. In their simplest form, such light sources are provided as lamps positioned externally of the closure element comprising at least partially a transparent section or an openable part. This solution has certain limitations as regards the visibility as the view into the vessel interior is at least partly impeded. That is, in case the closure element is not opened but includes a transparent section, the light source itself blocks the view. Alternatively, the closure element must be opened without it being possible to make sure that such opening is safe.

More elaborated examples of closure elements comprising illumination devices are given in the prior art of U.S. Pat. No. 3,764,794, WO 2010/010255 and US 2003/0103756. As it is desirable that the light sources for illumination purposes must be incorporated into the structure of the closure element, the space available is limited and the presence of the light sources must not compromise the overall function of the closure element. Hence, the light sources have most often been placed in the periphery of the closure element; however, this position is not always possible or optimal for particular fields of application of the closure element. It should also be borne in mind that such closure elements must also fulfil governmental regulations as to, among other things, hygiene and risk of explosions.

With this background it is an object of the invention to provide a closure element, by which these disadvantages are overcome and an improved solution in terms of sanitation, cleanability and surveillance is provided.

This and further objects are met by a closure element of the kind mentioned in the introduction, which is furthermore characterized in that said at least one light source is provided within a predefined zone located in the central cover unit, and that said at least one light source is confined within the central cover unit.

By providing the light source or light sources in a predefined zone in the central cover unit itself, and in a confined manner, a balance is found between the requirements of sufficient illumination of the interior of the vessel and the structural demands and limitations of such a closure element. Thus, there is no risk of parts of or the whole light source fall into the vessel in case of a defect. Furthermore, the set-up time for cleaning-in-place (CIP) is lowered, as is the time used for commissioning of a plant. The closure element makes it possible obtain more regular visual inspection and less down-time in production. The term "confined" is to be interpreted as meaning that the light source or light sources is/are integrated in or held entirely within the central cover unit and does/do not protrude outside the zone into for instance the flange or to the exterior of the central cover unit.

In a preferred embodiment the closure element is a cleaning cover which is openable, and wherein the at least one flange is circumferential and located at an edge portion of the central cover unit, the central cover unit comprising at least one transparent section constituting the predefined zone. By combining the cleaning cover with a transparent section a view not obstructed by exteriorly mounted lighting means is provided. Hence, visual inspection during manufacture is now possible and the requirement of having an inspection cover which can be easily opened after production is also fulfilled.

Preferably the central cover unit comprises a plate-shaped cover portion and a central body such that a circumferential wall of the central body surrounds a cavity, in which the at least one light source is provided, the at least one transparent section being formed as a transparent section of the plate-shaped cover portion at the cavity of the central body. This is a mechanically reliable solution providing a well-defined light area.

The plate-shaped cover portion may comprise an outer section surrounding the transparent section, the outer section being made from another material than the transparent section, which makes it possible to utilize a combination of materials having different properties in order to obtain optimal mechanical and visual/illuminating performance.

As an alternative, the plate-shaped cover portion may be made from a transparent material. This embodiment provides for the possibility of performing visual inspection and surveillance in a larger area of the closure element.

The material of the transparent section may preferably be made of polycarbonate. The advantage of using polycarbonate is that the material does not shatter and hence will not end up contaminating the material being processed in the case of a fracture or other damage. Furthermore it is possible to design the cover made of polycarbonate such that it is able to withstand a powder explosion. The closure element may be provided with central reinforcement in form of a lockable central body.

Correspondingly the material of the outer section may be made from steel. Steel is easy to clean and provides the outer section with a sufficient strength to withstand a pressure.

In a preferred embodiment the central body includes a cylindrical shell-shaped part and the plate-shaped cover portion has a generally circular shape. This eases the cleaning process and at the same time provides for a stable and reliable mechanical solution, as there are no edges that may be hard to clean and/or prone to be damaged.

In another embodiment the closure element is fixed and wherein the at least one flange is circumferential and located at an edge portion of the central cover unit, the central cover unit comprising at least one transparent section constituting the predefined zone and the transparent section is formed by a transparent sheet located between a first and a second flange.

The predefined zone may be circular and located near or at the center of the central cover unit. By positioning the predefined zone here the light sources and a possible camera can be positioned under the place where the lever is positioned and thereby saving precious viewing space.

The diameter of the predefined zone may be 30-100 mm, preferably 50 mm, which provides for a sufficient viewing and/or illuminating area.

The predefined zone may be ring-shaped or shaped as a spiral. It may also be other shapes such as triangular or oval depending on the purpose and the preferences of the user.

The predefined zone or zones may be formed as one or more intersecting strips or as non-intersecting strips.

In another embodiment the predefined zone is located at a distance from the peripheral flange. In this manner, the light and/or view is centered and the periphery of the closure element is not affected.

The distance may be at least 5 mm, preferably at least 50 mm.

The closure element may comprise at least one camera in the predefined zone. This facilitates surveillance from a distance. By placing the camera in the predefined zone, the camera, having approximately the same size as a LED, can take the place of one of the LEDs and still provide a direct view through the cover element as well as providing the possibility for a remote view.

The camera may be chosen from the group consisting of an infrared camera, an ordinary (visual) camera, and a camera making use of fibre optics. Depending on the process being surveilled, this facilitates the most suitable surveillance.

Advantageously, the closure element is able to withstand a nominal pressure of the vessel.

In a preferred embodiment the flange of the closure element is flush with an interior side of the vessel wall. This eliminates the edges of the prior art, such edges being in particular on the inside of the vessel difficult to clean and thus provides a more sanitary solution.

In a further embodiment, the closure element further comprises a sanitary grade sealing profile and design. By using a sanitary grade sealing profile the need for removing the cleaning cover in order to clean the cover is eliminated.

In the following, the invention will be described in further detail by means of the following description of preferred embodiments and with reference to the drawings, in which.

Figure 1:
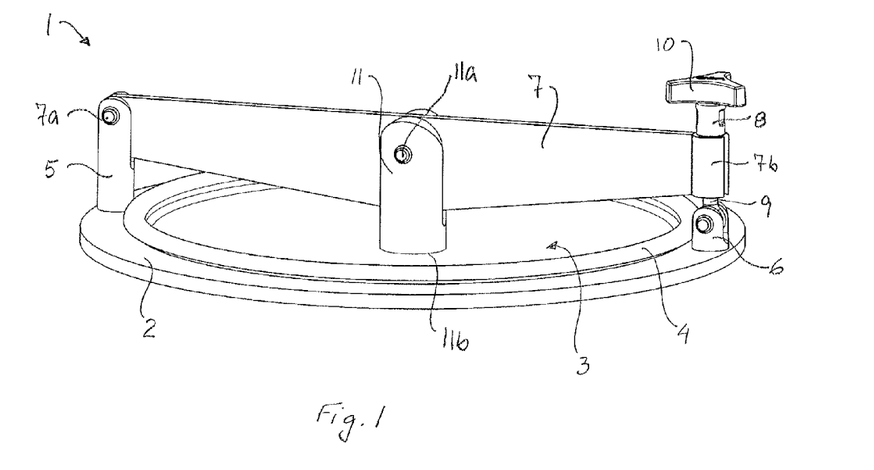
FIG. 1 shows a perspective view of a closure element in one embodiment of the invention.

In FIG. 1, a perspective view of an embodiment of the closure element according to the invention is shown. The closure element is in the form of a cleaning cover and is generally designated 1. In the embodiment shown, the cleaning cover 1 has a generally circular shape and comprises a circumferential flange 2 surrounding a central cover unit 3 and is furthermore provided with a peripheral ring 4 at the transition between the flange 2 and the central cover unit 3. Suitable sealing means may be provided at the transition. Preferably a sanitary embodiment of the sealing means is used, for instance a sanitary grade sealing profile 4a (cf. FIG. 3). This is easy to keep clean and to clean and apply to sanitary standards in the different industries such as in pharma and food industries.

Within the context of the present invention, the closure element is to be interpreted as any element fulfilling the function of covering an opening in a processing chamber, container, tank, duct or any similar vessel, and may for instance comprise a cleaning cover, a porthole, an inspection or sight glass, or any similar element penetrating the wall of the container to form a closure of the wall.

In the manufacture of powders on large process plants it is important to constantly monitor and survey the process in order to make sure that the requirements to the end product is fulfilled. Compared to prior art, the present invention addresses sanitation, cleanability and surveillance issues that are present in the prior art.

The closure element of the present invention is adapted to be installed in process equipment where it is desired to survey part of the equipment either visually on site or from a control room for example during production or after CIP. Such process equipment include but is not limited to noise silencers, air dispersers, spray dryer chambers, cyclones, flash dryers, granulators, chambers for bag filters, including chambers on the clean gas side and on the process gas side, powder traps, belt conveyors such as a FILTERMAT®, duct work that contains dry gas or process gas with powder, wet and dry scrubbers and scrubber/condensers.

In some of the embodiments below the requirement of having a sanitary cleaning cover that is easy to handle is combined with the demand for a sight glass equipped with encapsulated camera and light source.

In a mounted position, the cleaning cover 1 is installed in a wall 50 of a vessel (cf. FIG. 3) forming part of for instance a spray drying apparatus, to cover an aperture provided in the wall 50. The cleaning cover 1 may be installed in the wall by means of any suitable technique, for instance by welding or screwing the flange 2 of the cleaning cover 1 to the wall. In a preferred embodiment, the flange 2 is flush with the interior side of the wall 50 of the vessel. This is for sanitary reasons. In the embodiment shown, the closure element is openable, i.e. the cleaning cover 1 is intended to be brought from a closed position, in which the central cover unit 3 covers the aperture in the wall 50 up to the inner periphery of the flange 2, to an open position, in which there is physical access to the interior of the vessel through the aperture. In order to operate the cleaning cover 1, namely to open and close the central cover unit 3 with respect to the stationary flange 2, a handling device is provided. The handling device comprises a first projecting pin 5 and a second projecting pin 6 connected to the flange 2 of the cleaning cover 1 at diametrically opposite sides thereof. Furthermore, the handling device comprises a lever 7 which in a first end 7a is pivotally connected to the first projecting pin 5 and in a second end 7b is connected to a bushing member 8 which in turn is connected to a rotatable handle 10 to provide engagement with a spindle 9. Substantially halfway between the first and second ends 7a, 7b of the lever 7, the lever 7 is pivotally connected to a first end 11a of a central body 11. The central body 11 forms part of the central cover unit 3, and a second end 11b of the central body 11 being firmly connected to a plate-shaped cover portion to be described in further detail below. Thus, when turning the handle 10 in one direction (for instance counter-clockwise), the second end 7b is lifted while the entire lever 7 is rotated about the pivotal connection at the first end 7a. As a consequence, the central body 11 and, in turn, the plate-shaped cover portion are both lifted simultaneously, thus moving the entire central cover unit 3 away from the aperture and thus providing access to the interior of the container through the aperture in the container wall. Closure of the cleaning cover 1 is provided by turning the handle 10 in the opposite direction.

Figure 2:
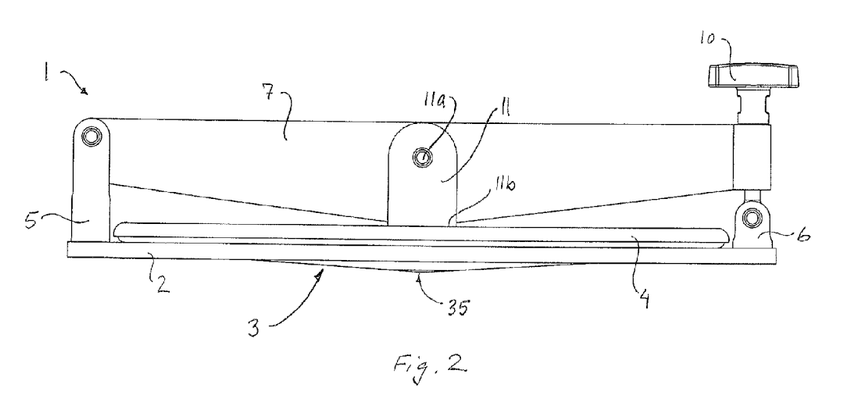
FIG. 2 shows a schematic side view of the closure element shown in FIG. 1.
Figure 3:
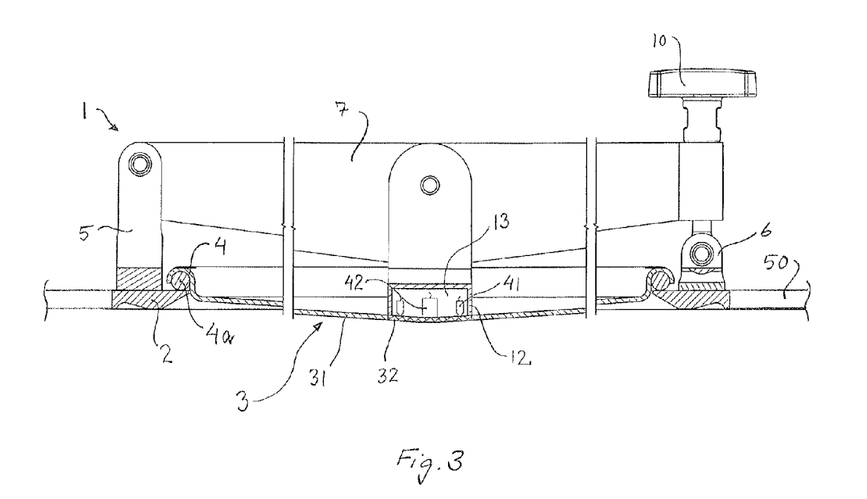
FIG. 3 shows, on a larger scale, a sectional side view of a detail of the closure element shown in FIG. 2.

Referring now in particular to the schematic side view shown in FIG. 2 and the sectional view of FIG. 3, it may be seen that at least one light source is provided within a predefined zone located in an area of the central cover unit, and that the at least one light source is confined within the central cover unit. Thus, in the embodiment shown, the central body 11 is formed with one part constituting a cylindrical shell-shaped part such that a circumferential wall 12 surrounds a cavity 13. In the cavity 13, at least one light source 41 and/or camera 42 is provided in a manner to be described in further detail below. The plate-shaped cover portion of the central cover unit 3 comprises a first section 31 extending from the outer periphery of the central cover unit 3 at the flange 2 to the central body 11, and a second section 32 covering the cavity 13 of the central body. Together, the two sections 31 and 32 cover the aperture defined by the inner periphery of the flange 2. The connection between the central body 11 and the first and second sections 31, 32 constituting the plate-shaped cover portion of the central cover unit in the embodiment shown may be performed in any suitable manner. There is a suitable connection between the first and second sections 31 and 32 in the area in which they face each other. The materials of the first section 31 and the second section 32, respectively, are chosen according to the demands in the particular field of application of the closure element. Examples of suitable materials are steel and polycarbonate, respectively, providing a combination of strength and transparency. Glass is also conceivable as a transparent material, but requires that the operating conditions do not pose a risk of breaking or shattering the glass. Other transparent food-grade materials are conceivable as well. In case the operating conditions involve a risk of static electricity in the transparent second section 32, the transparent material may be dispensed with altogether and substituted by a conductive material such as steel or carbon, leaving only an aperture for a camera 42.

In the embodiment shown, two light sources 41 and one camera 42 are shown, the light sources 41 being positioned diametrically opposite each other within a confined predefined zone 35 defined at the second section 32 of the cleaning cover 1, and the camera 42 positioned centrally. Within the context of the invention, "confined" is to be interpreted as meaning that the light sources are integrated in or held entirely within the central cover unit and do not protrude outside the zone into for instance the flange, to the exterior of the central cover unit. In the embodiment shown in FIGS. 1-3 the confined predefined zone 35 substantially corresponds to the cavity 13 in the central body 11. Other numbers and configurations of the light source(s) and the camera(s) are of course conceivable. The light source or light sources may in principle be any light emitting body having dimensions fitting into the confined space of the central body. Preferably, the light source comprises light-emitting diodes (LEDs) that are relatively robust and inexpensive, and have the further advantage of not generating large amounts of heat. The camera or cameras may be of any suitable kind, including infrared cameras, ordinary (visual) cameras and cameras making use of fibre optics. For instance, a good balance between the need for sufficient illumination and the desire to keep the power and heat to a minimum, is found in an embodiment of the closure element according to the invention, in which e.g. up to ten LEDs and one camera is provided in or integrated in one central cover unit. The signal from the camera may be transmitted to a display unit by means of traditional wiring but may also be wireless. The power supply to the light source(s) and/or camera(s) may be provided in any suitable manner, for instance by fixed wiring extending from the exterior and into the central body, or may include a battery package, in particular in the case of mobile start-up units, or in case the closure element is used as a mobile unit to mount temporarily in a wall of a vessel for trouble-shooting purposes.

Suitable respective dimensions of the parts of the closure element are chosen according to the demands of the particular field of application. In the embodiment shown, the diameter of the central cover unit 3 typically lies in the interval of 200 to 500 mm, for instance three predefined sizes: 200, 350 and 450 mm. The diameter of the central body 11 may vary in accordance with the size of the cover or be fixed to fit all sizes, typical values of the diameter of the central body 11 being 30-100 mm, for instance 50 mm. Alternative configurations of the central body are conceivable. Furthermore, alternative configurations of the predefined zone or zones are described further down in connection with the detailed description of FIGS. 8a to 8d.

The central body 11 and the plate-shaped cover portion 31,32 of the central cover unit 3 may be provided as separate parts or as an integrated unit. In the latter case, the entire central cover unit 3 may be exchanged in the case of failure of any of the parts.

In the embodiment shown in FIGS. 4 to 6, elements having the same or analogous function as elements of the first embodiment described in detail with reference to FIGS. 1 to 3 are denoted by the same reference numerals to which '100' has been added. Only differences from the first embodiment will be described in detail.

Figure 4:
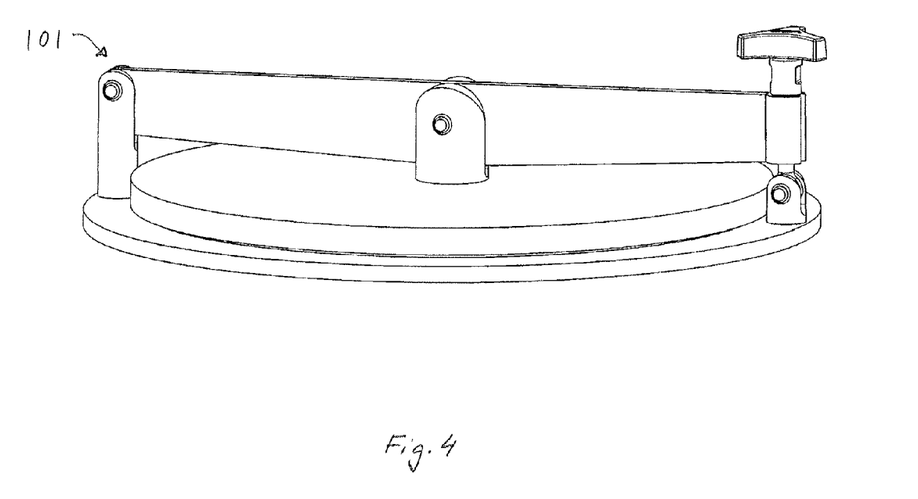
FIG. 4 shows a perspective view of a closure element in another embodiment of the invention.
Figure 5:
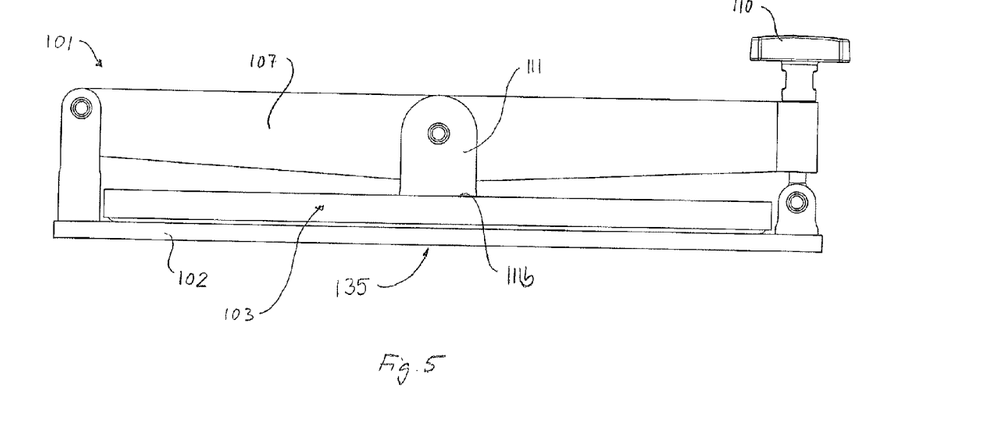
FIG. 5 shows a schematic side view of the embodiment shown in FIG. 4.
Figure 6:
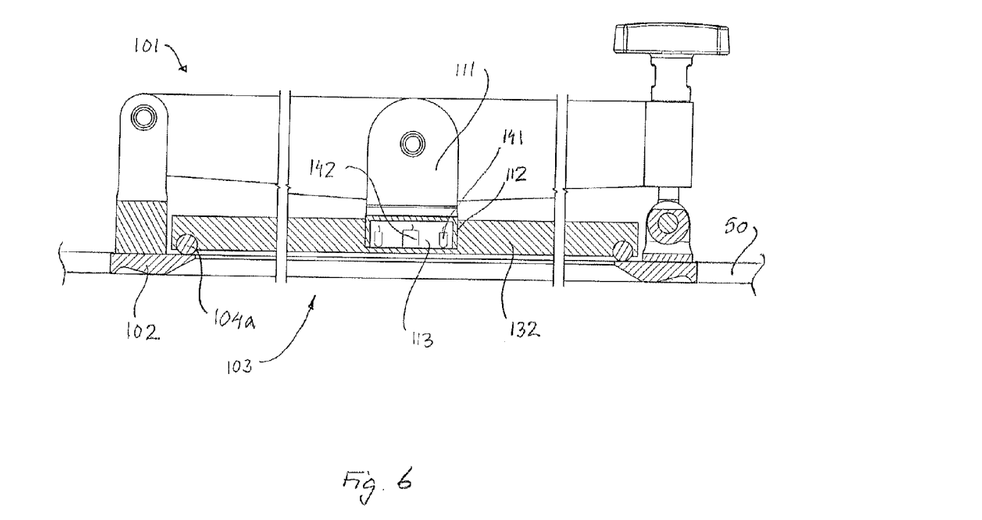
FIG. 6 shows, on a larger scale, a sectional side view of the closure element shown in FIG. 4.

The closure element of the embodiment of FIGS. 4 to 6 is also designed as a cleaning cover 101 intended to be opened and closed. As in the first embodiment, at least one light source is provided within a predefined zone located in the area of the central cover unit, and that the at least one light source is confined within the central cover unit 103. The main difference of the cleaning cover 101 when compared to the cleaning cover 1 is that the plate-shaped cover portion of the central cover unit 103 comprises a transparent sheet 132, which may for instance be formed by polycarbonate. The sheet 132 may extend from an outer periphery in which it has a suitable overlap with the flange 102 to an inner periphery, at which the sheet 132 abuts or is formed integral with the central body 111. At the overlap with the flange 102, a sealing profile 104a is provided. In the embodiment shown, the transparent sheet 132 is continuous and the second end 111b of the central body 111 is integrated in the transparent sheet 132 such that the shell-shaped cylindrical part is embedded in the transparent sheet 132. The connection between the central body 111 and the transparent sheet 132 constituting the plate-shaped cover portion of the central cover unit in the embodiment shown may be performed in any suitable manner, for instance here by moulding. As in the first embodiment, one or more light sources 141 and one or more cameras 142 are provided in the cavity 113 defined by the wall 112 of the central body 111. Hence, the visual area through the aperture of the flange 102 is provided in a zone not only on the interior side of the central body 111, i.e. the side facing the interior of the vessel, but also in the surrounding zone, i.e. from the outer side of the central body to the inner periphery of the flange 102.

In the alternative embodiment of FIG. 7, elements having the same or analogous function as elements of the first embodiment described in detail with reference to FIGS. 2 and 3 are denoted by the same reference numerals to which '200' has been added. Only differences from the first and second embodiments will be described in detail.

Figure 7:
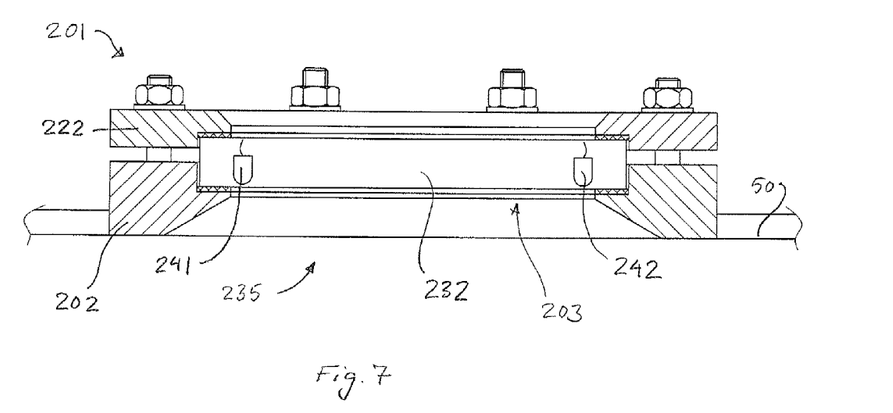
FIG. 7 shows a sectional side view corresponding to FIGS. 2 and 5, of an alternative embodiment of the closure element according to the invention.

In the embodiment of FIG. 7, the closure element 201 is fixed, i.e. is not intended to be opened and closed, and thus has the function of a sight-glass. To this end, the closure element 201 is provided with two flanges, a bottom flange 202 and a top flange 222. Between the two flanges 202 and 222, a transparent sheet 232 of glass, polycarbonate or any other suitable transparent material is placed, the transparent sheet 232 forming the central cover unit generally designated 203. As in the above-mentioned embodiments, at least one light source is provided within a predefined zone located in the area of the central cover unit, and that the at least one light source is confined within the closure element. The connection between the transparent sheet 232 and the flanges 202, 222 may be sealed in any suitable manner. In the confinement of the closure element 201, namely within the sheet 232, one or more light sources 241 and/or one or more cameras 242 may be positioned, for instance in that LEDs are moulded into the transparent sheet 232.

The configuration of the light source(s) and/or camera(s) may vary. In addition to the various configurations already mentioned in the above, further forms are indicated in FIGS. 8a to 8d, in which closure elements 1, 301, 401 and 501 are schematically indicated.

Figure 8A:
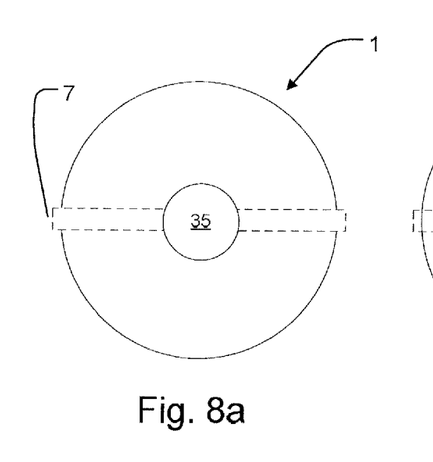
FIGS. 8a to 8d each shows a plan view of a detail of the closure element in further embodiments of the invention.
Figure 8B:
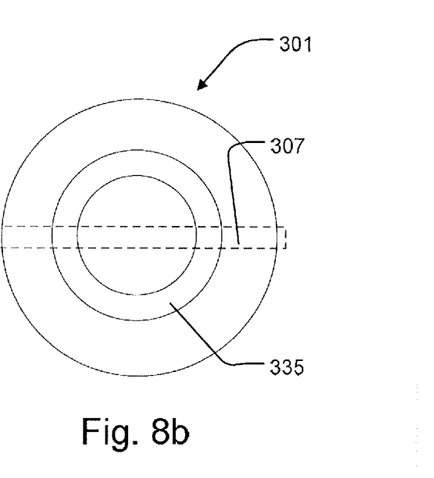
Figure 8C:
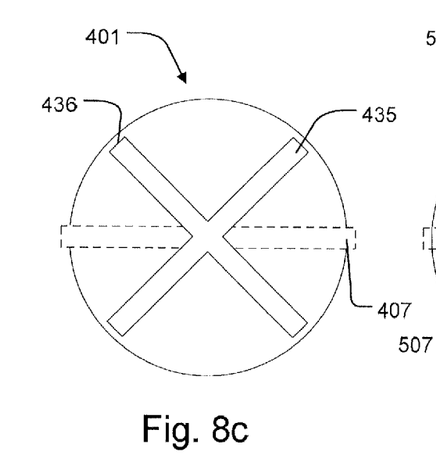
Figure 8D:
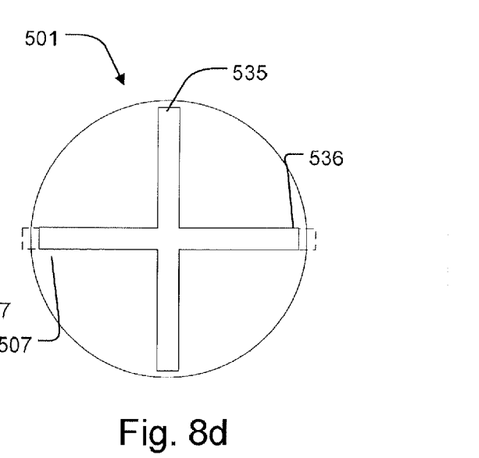

As described in the above the closure element 1 of the first embodiment, now indicated schematically in FIG. 8a, has its light sources and camera placed in a central predefined zone, viz. within the zone 35 substantially corresponding to the cavity 13 of the central body 11. Alternatively, the light source(s) and/or camera(s) may be positioned in a ring-shaped predefined zone 335 as shown in FIG. 8b, or as two intersecting strips forming predefined zones 435, 436 and 535, 536 as shown in FIGS. 8c and 8d, respectively.

In all of the above embodiments, various geometrical shapes are conceivable. Furthermore, the surfaces of the materials forming part of the closure element may be treated in any suitable manner. As an example, the surfaces of the transparent zones may be nano-coated to reduce the extent of depositions on the surface.

The invention should not be regarded as being limited to the embodiments shown and described in the above but various modifications and combinations of features may be carried out without departing from the scope of the following claims.

A feature from any embodiment may be combined with any feature from another embodiment.

The invention claimed is:

1. A closure element (1; 101; 301; 401; 501) adapted to be installed in a vessel wall (50) provided with an aperture, said closure element comprising:
    at least one peripheral flange (2; 102); and
    a central cover unit (3; 103), said central cover unit covering said aperture;
    at least one light source (41; 141) provided within a predefined zone (35; 135; 335; 435, 436; 535, 536) located in the central cover unit (3; 103),
    wherein the closure element is a cleaning cover (1; 101) which is openable, and the at least one flange (2; 102) is circumferential and located at an edge portion of the central cover unit (3; 103),
    wherein the central cover unit (3; 103; 203) includes at least one transparent section (32; 132; 232) constituting said predefined zone (35; 135; 335; 435, 436; 535, 536), and said at least one light source (41; 141) is confined within the central cover unit (3; 103), and
    wherein the flange is substantially flush with an interior side of the vessel wall.

2. A closure element according to claim 1, wherein the central cover unit (3; 103) comprises a plate-shaped cover portion (31, 32; 132) and a central body (11; 111) centrally located with respect to the plate-shape cover portion so as to be surrounded thereby such that a circumferential wall of the central body surrounds a cavity (13; 113), in which said at least one light source (41; 141) is provided, the at least one transparent section being formed as a transparent section (32; 132) of the plate-shaped cover portion at the cavity of the central body.

3. A closure element according to claim 2, wherein the plate-shaped cover portion comprises an outer section (31) surrounding the transparent section, said outer section being made from another material than the transparent section (32).

4. A closure element according to claim 3, wherein the material of said outer section (31) is steel.

5. A closure element according to claim 2, wherein the plate-shaped cover portion is made from a transparent material (132).

6. A closure element according to claim 5, wherein the material of said transparent section (32; 132) is polycarbonate.

7. A closure element according to claim 2, wherein the central body (11; 111) includes a cylindrical shell-shaped part and the plate-shaped cover portion (31, 32; 132) has a generally circular shape.

8. A closure element according to claim 1, wherein the predefined zone (35; 135; 235) is circular and located near or at the centre of the central cover unit.

9. A closure element according to claim 8, wherein the diameter of the predefined zone (35; 135; 235) is 30-100 mm, preferably 50 mm.

10. A closure element according to claim 1, wherein the predefined zone (335) is ring-shaped or shaped as a spiral.

11. A closure element according to claim 1, wherein the predefined zone or zones (435, 436; 535, 536) are formed as one or more intersecting strips.

12. A closure element according to claim 1, wherein said predefined zone is located at a distance (35; 135; 335; 435, 436; 535, 536) from the peripheral flange (2; 102).

13. A closure element according to claim 12, wherein the distance is at least 5 mm, preferably at least 50 mm.

14. A closure element according to claim 1, wherein the closure element comprises at least one camera (42; 142; 242) in said predefined zone.

15. A closure element according to claim 14, wherein said camera is chosen from the group consisting of an infrared camera, an ordinary (visual) camera, and a camera making use of fibre optics.

16. A closure element according to claim 1, wherein said closure element is able to withstand a pressure that at least corresponds to a nominal pressure of the vessel.

17. A closure element according to claim 1, wherein the flange (2; 102; 202, 222) of the closure element is flush with an interior side of the vessel wall (50).

18. A closure element according to claim 1, wherein the closure element further comprises a sanitary grade sealing profile and design.

19. A closure element (201) adapted to be installed in a vessel wall (50) provided with an aperture, said closure element comprising:
    at least one peripheral flange (202, 222); and a central cover unit (203) covering said aperture; and at least one light source (241) provided within a predefined zone (235) located in the central cover unit (203), wherein the closure element (201) is fixed and the at least one flange (202, 222) is circumferential and located at an edge portion of the central cover unit, wherein the central cover unit includes at least one transparent section constituting said predefined zone and the transparent section (232) is formed by a transparent sheet located between a first and a second flange and said at least one light source (241) is confined within the central cover unit (203), and wherein the flange is substantially flush with an interior side of the vessel wall.

20. A closure element (1; 101; 201; 301; 401; 501) adapted to be installed in a vessel wall (50) provided with an aperture, said closure element comprising:

at least one peripheral flange (2; 102; 202, 222);

a central cover unit (3; 103; 203) covering said aperture; and at least one light source (41; 141; 241) provided within a predefined zone (35; 135; 235; 335; 435, 436; 535, 536) located in the central cover unit (3; 103; 203), wherein the central cover unit (3; 103; 203) includes at least one transparent section (32; 132; 232) constituting said predefined zone (35; 135; 235; 335; 435, 436; 535, 536), and said at least one light source (41; 141; 241) is confined within the central cover unit (3; 103; 203), and wherein the flange is substantially flush with an interior side of the vessel wall.

21. A closure element according to claim 20, wherein the closure element is a cleaning cover (1; 101) which is openable, and wherein the at least one flange (2; 102) is circumferential and located at an edge portion of the central cover unit (3; 103).

22. A closure element according to claim 21, wherein the central cover unit (3; 103) comprises a plate-shaped cover portion (31, 32; 132) and a central body (11; 111) centrally located with respect to the plate-shape cover portion so as to be surrounded thereby such that a circumferential wall of the central body surrounds a cavity (13; 113), in which said at least one light source (41; 141) is provided, the at least one transparent section being formed as a transparent section (32; 132) of the plate-shaped cover portion at the cavity of the central body.

23. A closure element according to claim 22, wherein the plate-shaped cover portion comprises an outer section (31) surrounding the transparent section, said outer section being made from another material than the transparent section (32).

24. A closure element according to claim 23, wherein the material of said outer section (31) is steel.

25. A closure element according to claim 22, wherein the plate-shaped cover portion is made from a transparent material (132).

26. A closure element according to claim 22, wherein the central body (11; 111) includes a cylindrical shell-shaped part and the plate-shaped cover portion (31, 32; 132) has a generally circular shape.

27. A closure element according to claim 21, wherein the material of said transparent section (32; 132) is polycarbonate.

28. A closure element according to claim 20, wherein the closure element (201) is fixed and wherein the at least one flange (202, 222) is circumferential and located at an edge portion of the central cover unit, the transparent section (232) being formed by a transparent sheet located between a first and a second flange.

29. A closure element according to claim 20, wherein the predefined zone (35; 135; 235) is circular and located near or at the centre of the central cover unit.

30. A closure element according to claim 29, wherein the diameter of the predefined zone (35; 135; 235) is 30-100 mm, preferably 50 mm.

31. A closure element according to claim 20, wherein the predefined zone (335) is ring-shaped or shaped as a spiral.

32. A closure element according to claim 20, wherein the predefined zone or zones (435, 436; 535, 536) are formed as one or more intersecting strips.

33. A closure element according to claim 20, wherein said predefined zone is located at a distance (35; 135; 335; 435, 436; 535, 536) from the peripheral flange (2; 102).

34. A closure element according to claim 33, wherein the distance is at least 5 mm, preferably at least 50 mm.

35. A closure element according to claim 20, wherein the closure element comprises at least one camera (42; 142; 242) in said predefined zone.

36. A closure element according to claim 35, wherein said camera is chosen from the group consisting of an infrared camera, an ordinary (visual) camera, and a camera making use of fibre optics.

37. A closure element according to claim 20, wherein said closure element is able to withstand a pressure that at least corresponds to a nominal pressure of the vessel.

38. A closure element according to claim 20, wherein the flange (2; 102; 202, 222) of the closure element is flush with an interior side of the vessel wall (50).

39. A closure element according to claim 20, wherein the closure element further comprises a sanitary grade sealing profile and design.

\* \* \* \* \*